United States Patent [19]

Florence et al.

[11] 4,030,077

[45] June 14, 1977

[54] MULTISTAGE SORTER HAVING PUSHDOWN STACKS FOR ARRANGING AN INPUT LIST INTO NUMERICAL ORDER

[75] Inventors: Judit Katalin Florence, Menlo Park; Michel Alexandre Rohner, San Jose, both of Calif.

[73] Assignee: The Singer Company, Binghamton, N.Y.

[22] Filed: Oct. 16, 1975

[21] Appl. No.: 622,911

[52] U.S. Cl. .......................................... 340/172.5
[51] Int. Cl.² ........................................ G06F 7/24
[58] Field of Search .................... 340/172.5; 444/1

[56] References Cited

UNITED STATES PATENTS

| | | | |
|---|---|---|---|
| 2,901,732 | 8/1959 | Canning | 340/172.5 X |
| 2,985,864 | 5/1961 | Fillebrown et al. | 340/172.5 |
| 2,987,705 | 6/1961 | Van Mechelen | 340/172.5 |
| 3,029,413 | 4/1962 | O'Connor et al. | 340/172.5 |
| 3,234,524 | 2/1966 | Roth | 340/172.5 |
| 3,242,466 | 3/1966 | Dirks | 340/172.5 |
| 3,380,029 | 4/1968 | Goetz | 340/172.5 |
| 3,428,946 | 2/1969 | Batcher | 340/172.5 X |
| 3,540,000 | 11/1970 | Bencher | 340/172.5 |
| 3,740,538 | 6/1973 | Hemphill | 340/172.5 X |
| 3,775,753 | 11/1973 | Kastner | 340/172.5 |

OTHER PUBLICATIONS

H. Nagler, "Amphisbaenic Sorting" in Journal of Association for Computing Machinery, Oct. 1959, pp. 459–468.
M. A. Goetz, "Some Improvements in the Tech. of String Merging & Internal Sorting" in Proceedings—Spring Joint Computer Conf., 1964; pp. 599–607.

*Primary Examiner*—Melvin B. Chapnick
*Attorney, Agent, or Firm*—Paul Hentzel; James C. Kesterson

[57] ABSTRACT

An input list of N numbers is clocked through a first sort stack which provides S2 groups of S1 numbers each arranged in ascending numerical order. The numbers are stored in a buffer where the first location within each group always contains the smallest number in that group. These S2 first numbers are loaded into a second sort stack which arranges them in ascending numerical order. The first location in the second stack contains the smallest number in the entire list of N numbers. This smallest number is clocked out of the second stack to form the first number in the output list. A replacement number is numerically sorted into the second stack from the S2 groups each time the smallest remaining number is clocked out. This replacement number is the next smallest number from the same group as the most recently clocked out number. Each time the smallest remaining number is clocked out, the remaining numbers in the second stack are rearranged to accommodate the replacement number for maintaining numerical order. Thus the smallest remaining number whether from the second stack or from the buffer is always advanced to the first location of the second stack. Each stack includes a push-down shift register which contains already sorted numbers (B) at the top of the stack. Each new number (A) is compared to the sorted number (B) at each location. If the replacement number (A) is greater than the previously sorted number (B) at a particular stack location, the replacement number (A) is loaded into that location. The sorted numbers (B) at that location and all subsequent locations are simultaneously pushed down by one location. The input numbers (A) are thus sequentially inserted in numerical order into the stack of already sorted numbers (B).

21 Claims, 12 Drawing Figures

Fig_1

Fig_2

*Fig_3A*

*Fig_3B*

*Fig_3C*

*Fig_3D*

*Fig_3E*

*Fig_3F*

*Fig_4*

Fig_5

MULTISTAGE SORTER HAVING PUSHDOWN STACKS FOR ARRANGING AN INPUT LIST INTO NUMERICAL ORDER

BACKGROUND OF THE INVENTION

1. Field of the Invention

This invention relates to numerical sorting logic and more particularly to multipass numerical sorting logic where the input list is divided into groups which are individually sorted and then merged to form a single sorted output list.

2. Description of the Prior Art

Heretofore, numerical sorting was done primarily by relatively slow software programs. The limited sorting hardware that was available is based on a cumbersome comparison technique which sometimes required more comparator elements than words in the input list. In some instances the circuitry required increased geometrically as the number N of elements in the input list expanded. Further, these prior art hardware and software sorters are not fast enough for CRT display applications. The following references teach prior art sorting:

A. K. E. Batcher: Sorting Networks and Their Applications (AFIPS Proc., Vol. 32, 1968, p. 307);

B. D. G. O'Connor et al: Sorting System with N-Line Sorting Switch

C. Knuth: Art of Computer Programming, Vol. 3, Sorting and Searching, para. 5.3.4, Networks for Sorting; and D. W. H. Kautz: Cellular Logic-in-Memory Arrays (IEEE Transactions on Computers, August 1969, page 719).

SUMMARY OF THE INVENTION

It is therefore an object of this invention to provide:

a hardward numerical sorter which is faster and requires less circuitry;

a multipass hardware numerical sorter in which the input list is sorted separately by smaller groups and then merged into a single sorted output list;

a multipass hardware sorter which avoids simultaneously comparing any single item in the input list of N items to all of the other N-1 items;

a two-pass hardware sorter in which the number of passes (M), and the number of groups (Q) within each pass, and the size (P) of each group is optimized to minimize the time and hardware required to sort an input list of N items;

a two-stage hardware sorter that has S1 comparators in the first stage and S2 comparators in the second for sorting N input items where N=S1*S2; and a two-pass sorter for sorting N input items by making only 2N comparisons.

Briefly, the present M-pass sorter accomplishes these and other objects by dividing the input list into Q groups or runs of items which are individually sorted into numerical order and then progressively merged and resorted into Q2, Q3—Qm-1 and Qm groups to provide a single output list.

BRIEF DESCRIPTION OFF THE DRAWING

Further objects and advantages of the multipass sorter and the operation of the numerical sort stack will become apparent from the following detailed description taken in conjunction with the drawings in which.

DESCRIPTION OF THE PREFERRED EMBODIMENTS

The Sorting Problem

A given input list has N unordered items or elements. Each element has a key (K) and a non-key (NK) part. The objective of the sorting is to obtain an output list in which the elements appear in ascending (or descending) order of the keys. For example, a list of 100 vertices, each represented by its X,Y,Z coordinates, are to be sorted in order to their Y coordinates. The elements of the list are the vertices, the key part is the Y coordinate, and the non-key part is comprised of the X and Z coordinates.

In the multipass sorting method, the ordering is accomplished in two basic steps. First, the input list is divided into groups and sorted into ascending runs. A run is a sorted segment of the list. The relationship of the keys of the i-th run is:

$$K_{i1} \leq K_{i2} \ldots K_{ij} \leq \ldots \leq K_{ip}$$

If there are P keys in each run of a list of N elements, there will be $Q = N/P$ runs. This first step required a single hardware stage. At this point in the sorting process, the numerical relationship of the keys from different runs to each other is unknown.

In the second step of sorting, the Q runs from the first step are merged into a single sorted list. This second step requires one or more hardware stages. The "replacement selection" technique of merging is employed, which operates as follows:

The first (smallest) key of each run or group ($K_{11}$, $K_{21}$, $K_{31}$ ... $K_{q1}$) are compared to each other, the smallest of this series is the first key in the second pass output -- for instance, the first key from the third run, $K_{31}$. The next smallest key must be either the smallest of all the other runs or the second smallest key of the third run, $K_{32}$. As $K_{31}$ advances to the second stage output, $K_{32}$ is compared to the remainder of the series ($K_{11}$, $K_{21}$, $K_{41}$, ... $K_{q1}$) to determine the next smallest key of the list. The procedure goes on by replacing each subsequently selected key by the next larger key from the same run, until all the runs are exhausted.

The second pass outputs can be merged in like manner by subsequent stages until a single sorted output list is obtained. In the subsequent passes the runs become longer and number of runs fewer.

Two-Pass Sorter

Figure 1:
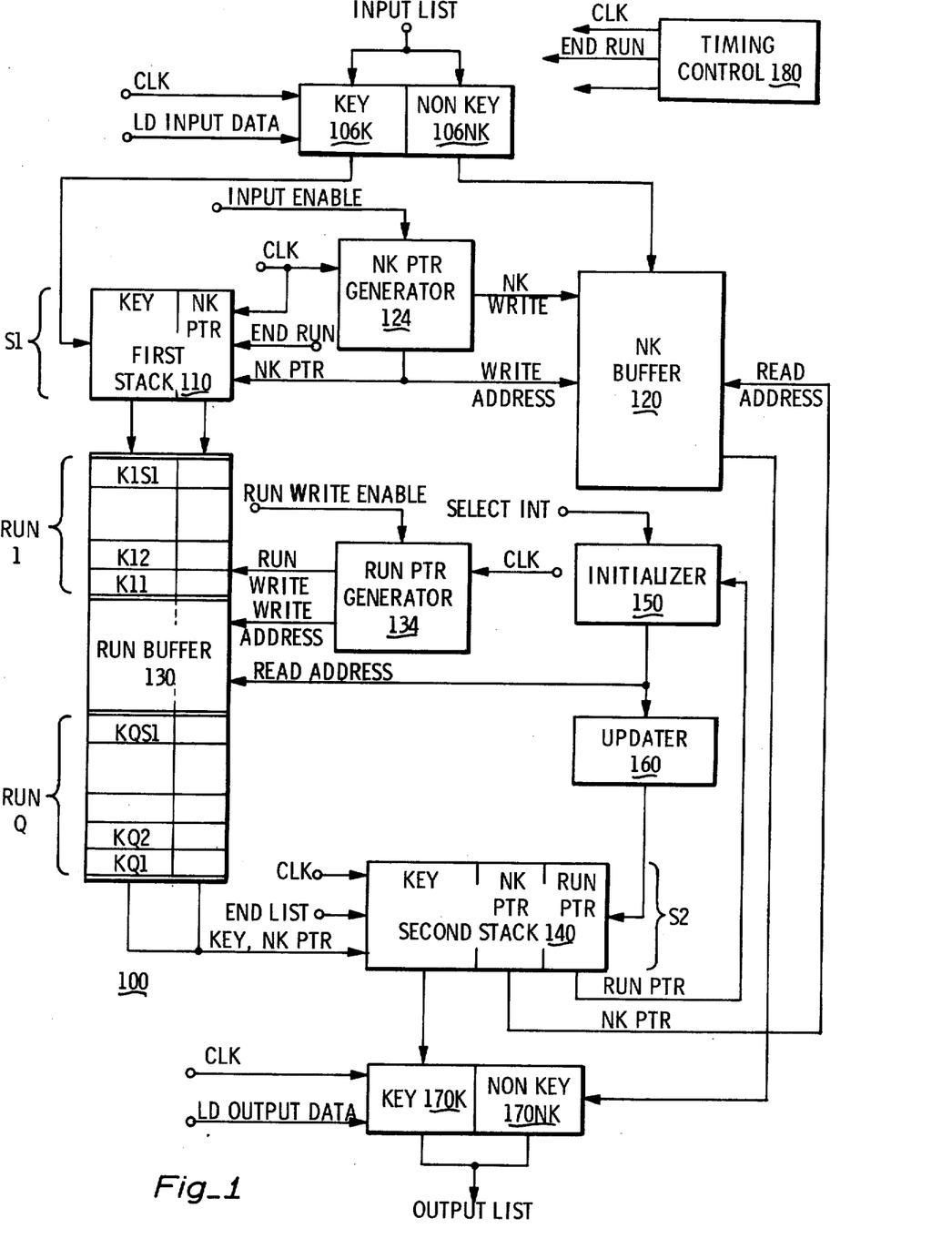
FIG. 1 is a block diagram of a two-pass sorter with a RAM buffer between stages.

FIG. 1 shows a block diagram for a two-pass sorter 100. During the first pass each word of the input list of N words is individually clocked through the key (K) and non-key (NK) sections of an input register 106 (K and NK). The key portions of the first S1 words of the input list are ascendingly sorted in a first-pass sort stack 110. The non-key portions are simultaneously clocked into an N position NK buffer 120 in order of arrival (list order). An NK buffer pointer generator 124 provides a non-key buffer pointer (NK PTR) for each NK portion as they enter NK buffer 120. Each NK PTR is inserted into stack 110 adjacent to the corresponding key portion to establish a retrieval link between the keys and non-keys. After the first run of S1 keys has been inserted into stack 110 in numerical order, the S1 keys are clocked into a run buffer 130 which is capable of holding S2 runs of S1 keys each — N keys. A run pointer (RUN PTR) generator 134 provides the address in run buffer 130 for writing the N sorted keys. As first stack 110 downshifts into run buffer 130 the upper positions become available to start sorting the next P keys. At the end of the first pass (N + S1 clocks) all the key portions of the N words in the input list are written in run buffer 130 and arranged in S2 sorted runs of S1 keys each. The NK portions of the input words are stored in order of arrival in NK buffer 120.

In the second pass, the keys of the S2 runs are merged into a second sort stack 140. Stack 140 is similar in function to stack 110. The words are inserted into stack 140 in ascending order of their keys. Each key is accompanied by its NK PTR and a run buffer pointer (RUN PTR) which is the address of the next element of the same run in run buffer 130.

The second sort pass is initialized by S2 clocks which load the smallest key of each run (the first key) into sort stack 140. An initializer 150 generates run buffer 130 addresses for the initial keys. During initialization, initializer 150 is incremented by S1, S2 times, i.e. the smallest key of the $j$-th run is in run buffer address $j*S1$, and the range of $j$ is from $O$ to S2-1. Run buffer pointers (RUN PTR) to accompany each key (pointer to the next key of the same run) are generated by an updater 160 which adds one to the address, i.e. $j*S1+1$. The RUN PTR's are loaded into sort stack 140 during the next clock cycle, along with the $jS1+1$ key and the $j*S1+1$ NK PTR from run buffer 130. After initialization, the smallest key of the S2 runs is at the bottom of second stack 140 while the smallest key (the replacement key) of the rest of the runs is either just above the smallest key or in the bottom position of the run from which came the smallest key. The smallest key is clocked out through output register 170K. The NK PRT accesses the non-key portion of the smallest key from NK buffer 120 which is clocked out through output register 170 NK. The RB PTR of the output key is updated by the addition of one in updater 160 is address the replacement key (the next smallest key in the run of the output key). This process continues recursively until all runs are exhausted. A timing control 180 provides the CLOCK and other control signals for initiating and coordinating the operation of two-pass sorter 100.

In order to minimize hardware and time requirements of the FIG. 1 two-pass sorter 100, the number of groups (S2) should be a number close in size to the number of keys (S1) in each group. Preferably in the two-pass case, S1 = S2 = 16. Further, first stack 110 may process the first pass of the next list while second stack 140 processes the second pass of the previous list in overlap fashion.

The Sort Stack

Sorting stacks 110 and 140 use a random insert, push-down circuit where the input key can be inserted in any location. The key already in the stack at the new key location and the keys in the locations prior thereto (containing smaller keys) are pushed down.

The keys already in the stack are assumed to be in sorted order on the top of the stack. The key to be inserted is simultaneously compared with all the other keys in the stack. The new key is inserted below larger keys and on top of smaller or equal keys, which are pushed down. When the stack is filled, all the keys therein are in sorted order. The stack is unloaded through a clocked push-down operation, smallest key first.

Figure 2:
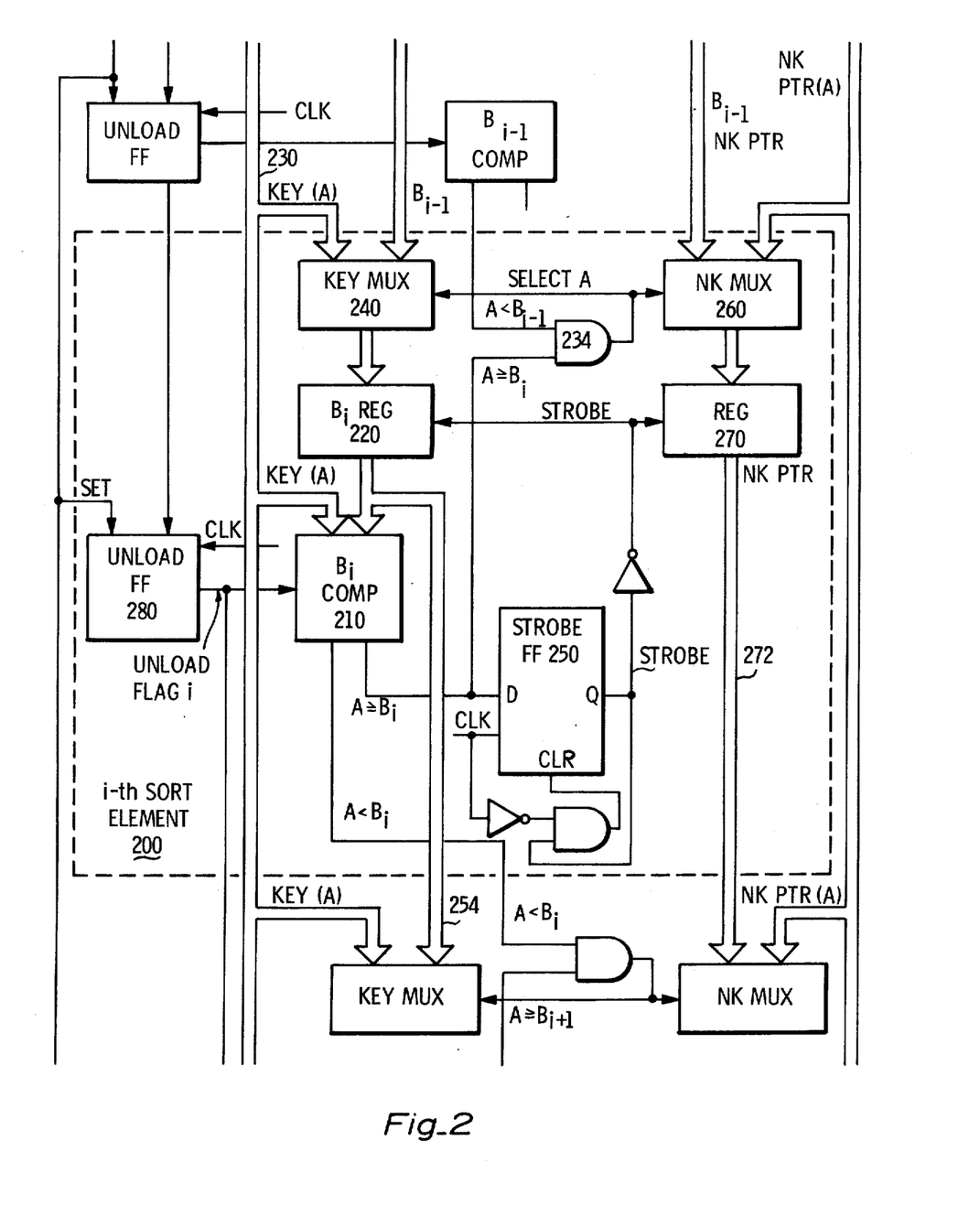
FIG. 2 is a detailed logic circuit of a portion of the first or second sort stack FIG. 1 showing the $i$-th sort element and portions of the preceding sort element $i-1$ and the subsequent sort element $i+1$.

FIG. 2 shows a detailed logic diagram of the $i$-th sort element 200 of first sorting stack 110 or second sorting stack 140. A comparator 210 compares the contents of register 220 (sorted key, Bi) with the data on bus 230 (input key, A). Input key A is simultaneously compared to sorted keys in each element of the sort stack. If A is less than Bi the contents of register 220 remain unchanged, and an "A < Bi" signal is advanced to the $i+1$ sort element. If A is greater than or equal to Bi (and less than Bi-1) select gate 234 provides the logic signal "SELECT A" to key multiplexer 240. Input key A is loaded into register 220 at the next clock pulse in response to a STROBE bar pulse from strobe flip flop 250. The previous sorted key Bi contents of register 220 are advanced to the next sort element $i+1$ on key output bus 254. The pointer associated with each A and B key is received by pointer multiplexer 260 in accordance with the output of select gate 234, and is either held in pointer register 270 or advanced to sort element $i+1$ on pointer output bus 272 in response to STROBE bar pulse from strobe flip flip 250. Unload flip flop (unload FF) 280 advances sorted keys stored from the previous sort. A 1 UNLOAD FLAG from unload FF 280 will force comparator 210 output to be A < Bi. Input key A appears larger than sorted key Bi in register 220. A 0 output from unload FF 280 causes a normal comparision of sorted key B with input key A. Each sort element has an unload FF. The unload FF's are organized like a shift register. Each time a new key is inserted into the stack, another 0 is loaded into the top unload FF causing the entire flip flop contents to shift down one location. When all the unload FF are 0, the sorting is completed for that run, and a "SET" signal returns all the unload FF to 1 which permits them to be unloaded.

UNLOAD FLAGS

FIG. 3A-F illustrates this insertion and push-down technique in more detail by describing the operation of a six location sort stack example. Keys IV, I, V, II, VI and III are sorted in ascending order.

Figure 3A:
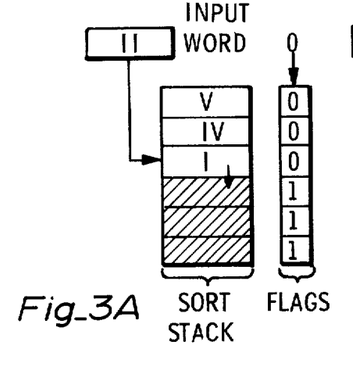
FIG. 3 of (A-F) shows the operation of the UNLOAD FLAG which appears after each group has been sorted and causes the stacks to begin unloading.

FIG. A. Three sorted words, I. IV and V, are already in the stack. Their flags are 0. The input key II is presented to the top four locations and is inserted in the third location. The key I already in location 3 is pushed down to location 4. The 0 FF outputs are shifted down one location to occupy the first four locations.

Figure 3B:
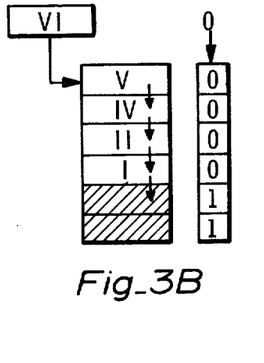

FIG. B. The next key, VI, is presented to the top five locations. The flag in location 5 becomes zero.

Figure 3C:
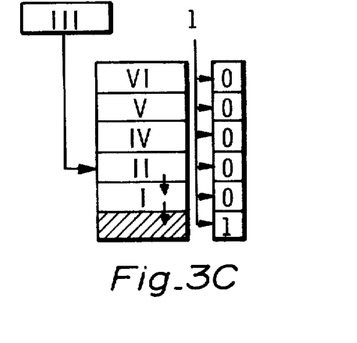

FIG. C. The last key, III, to be sorted is presented to the six locations. All the unload FF are simultaneously set to 1 UNLOAD FLAG to prepare the stack for unloading.

Figure 3D:
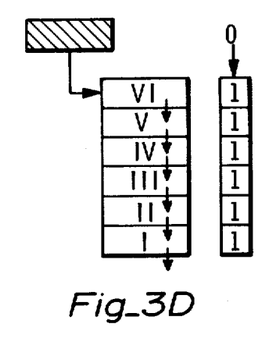

FIG. D. All the keys are sorted in the stack and ready to be unloading. All the FF outputs are 1. The first key of the next sort is ready to be inserted on top of the stack.

Figure 3E:
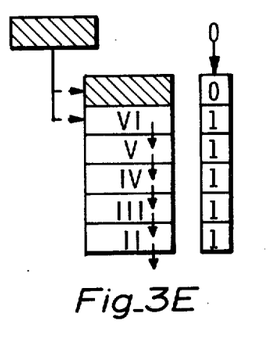
Figure 3F:
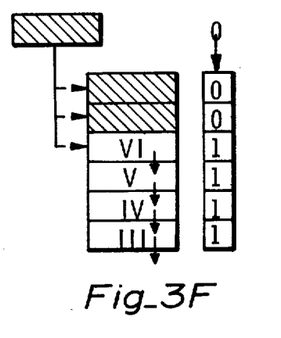

FIG. E & F. The sorted keys are unloaded through a pushdown operation while the keys of the next sort are being sorted into the vacated locations on top of the stack. The UNLOAD FLAGS on top of the stack become 0 as new keys are inserted.

EMPTY FLAGS

Figure 4:
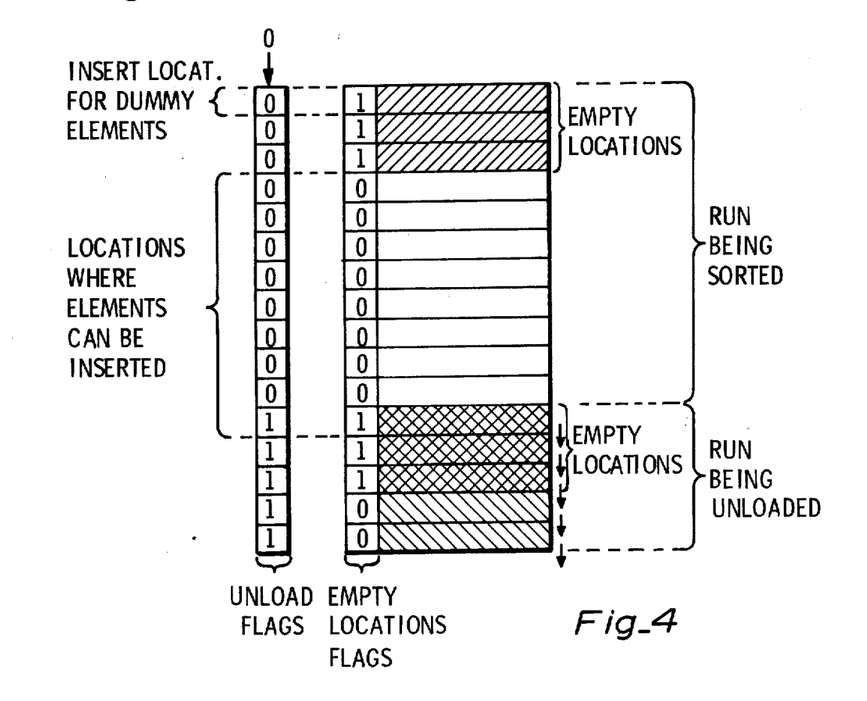
FIG. 4 shows the operation of the EMPTY FLAG which identifies empty locations in the interstage RAM buffer.

FIG. 4 illustrates the operations of EMPTY FLAG (EF) which are used in addition to the UNLOAD FLAGS to identify empty locations within the sort stack. Empty locations are created whenever a key is unloaded and no replacement key is present at the input of the stack. The capacity of the stack is of fixed length. All empty locations are flagged with EF = 1. The UNLOAD FLAG is used to differentiate between the keys of the run presently being sorted and the keys of the previous run which are presently being unloaded. Within each run, the EMPTY FLAG differentiates between keys and empty locations. Empty locations are flagged with EF= 1 and are inserted on top of the stack. The keys A to be sorted are inserted only in the locations where both unload flags and empty flags are zero, except whenever the new key A is smaller than all sorted keys B of the run already in the stack. In this case key A is inserted in the next location down, which does not have 1 output (UNLOAD FLAG). The condition for an exhausted run of all empty locations can be detected by several means. If S1 is a power of two, e.g. $S1 = 2^b$, then the run is empty when the b least significant bits of RUN PTR are zero. Alternatively, when a run has less than S1 elements, the EF is set in the first sort pass and stored in the run buffer. When either of these conditions is detected, the EF at the input of the second stage stack is set to a logical one. This has the effect of a dummy word being inserted at the top of the stack and all the other words being pushed down. Initializer 150 and Updater 160.

Figure 5:
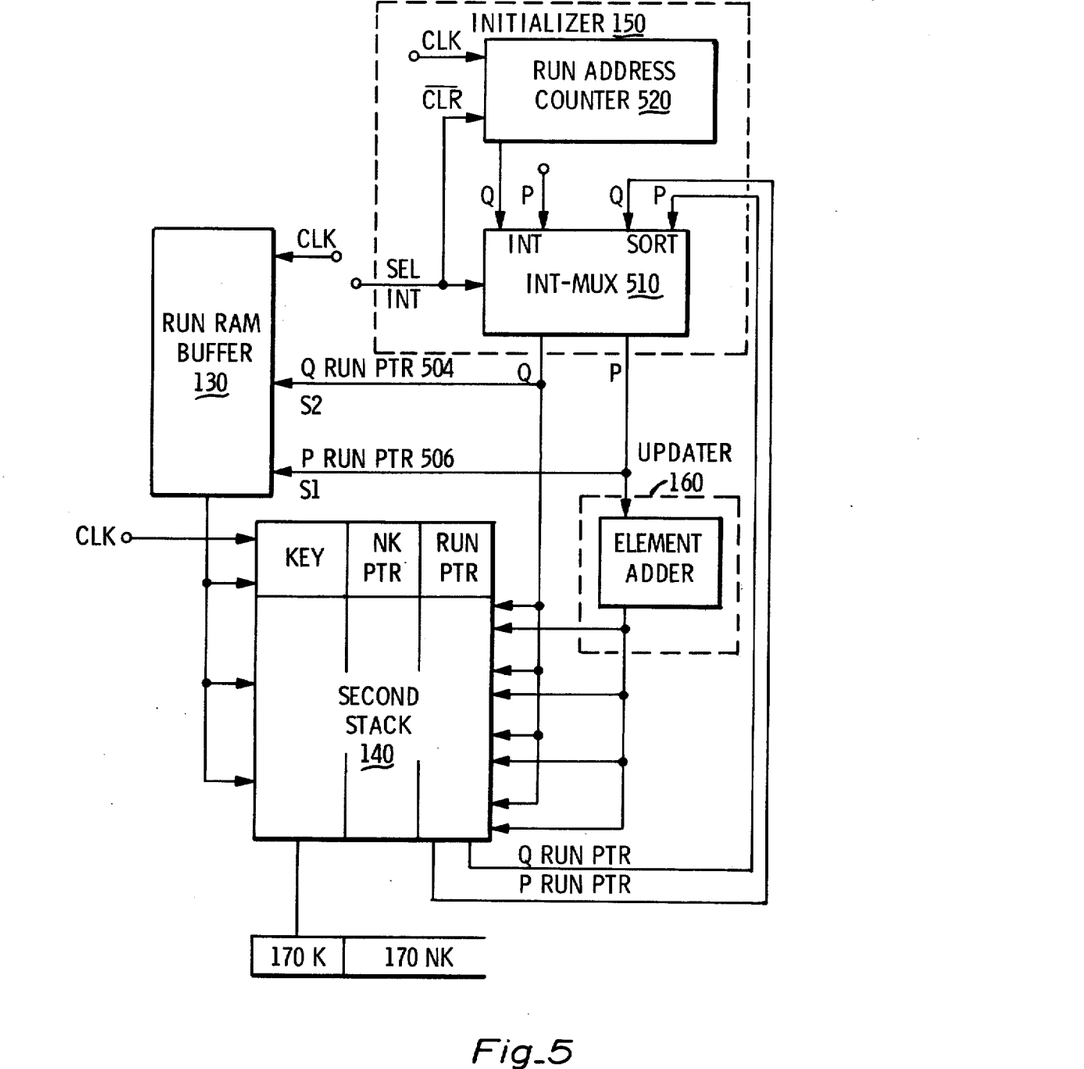
FIG. 5 shows a detailed logic circuit of the FIG. 1 initializer and updating circuitry operating between the second stack and the interstage RAM.

FIG. 5 shows a detail logic diagram of initializer 150 and updater 160. The RUN PTR is shown in two channels, a run channel 504 for the S2 address and an element channel 506 for the S1 address. During initialization, initializer multiplexer (Int-MUX) 510 selects run address counter 520 which supplies the S2 addresses for initialization. Run address counter 520 counts from 0 to S2-1 in the run channel. The element channel is a hard-wired 0 during initialization. The first location of each run in run buffer 130 is thereby addressed causing the smallest key of each of the S2 runs to enter into second stack 140. While run buffer 130 is addressed, the addresses are updated by updater 160 and entered into second stack 140 between the current key and NK PTR output of run buffer 130. After the Q CLOCK initialization, Int-MUX 510 selects RUN PTR's from second stack 140. Second stack 140 begins to sort and output the smallest keys through register 170. As each key is sorted its updated RUN PTR is processed through Int-MUX 510 to run buffer 130 to address the replacement key (the next smallest number in the same run as the output key). The sorting of second stack 140 continues until all of the runs are exhausted — N CLOCKs.

TIMING

Figure 6:
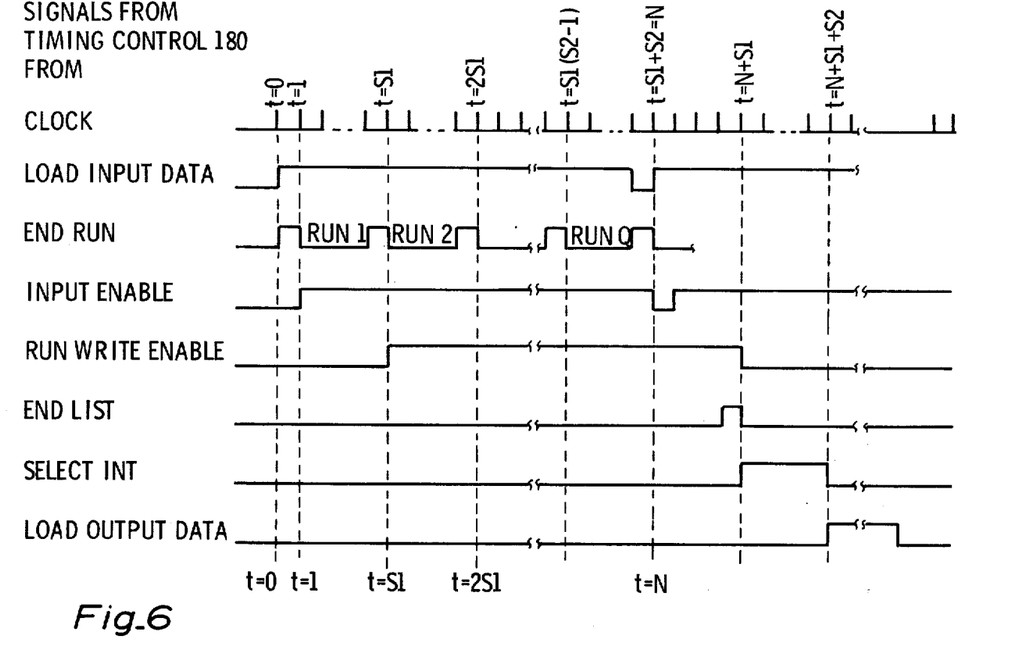
FIG. 6 is a timing diagram of the control signals from the FIG. 1 timing control circuit.

FIG. 6 shows the control signals from timing control 180 which synchronize the operation of sorter 100. From t=0 to t=N-1 LOAD INPUT DATA is applied to input register 106 for loading the input list of N items. Also at t=0 an END RUN pulse is applied to first stack 110 establishing UNLOAD FLAGS which cause sort elements 200 to start the shift down of the previous run (if any) creating room for the present run. END RUN is reapplied at S1 clock intervals to initiate unloading of each run after sorting. From t=1 to t=N INPUT ENABLE is applied to NK PTR generator 124 which enables NKB to write and provides the write addresses (NK PTR) to NK buffer 120 and first stack 110. From t=S1 to t+N+S1 (N clocks), RUN WRITE ENABLE is applied to RUN PTR generator 134 which enables RUN buffer 130 to write and provides the write addresses. At t=N+S1 an END LIST pulse is applied to second stack 140 establishing UNLOAD FLAGS to initiate unloading of the previous list (if any) creating room in stack 140 for the present list. END LIST is reapplied at intervals of N clocks. From t=N+S1 to t=N+S1+S2 (S2 clocks) SELECT INT is applied to initializer 150 for inserting the smallest key from each of the S2 runs into stack 140. SELECT INT is reapplied at intervals of N clocks for a duration of S2 clocks. From t=N+S1+S2 to t=2N+S1+S2 (N clocks) LOAD OUTPUT DATA is applied to output register 170.

Single Sort Stack - No Overlap

Figure 7:
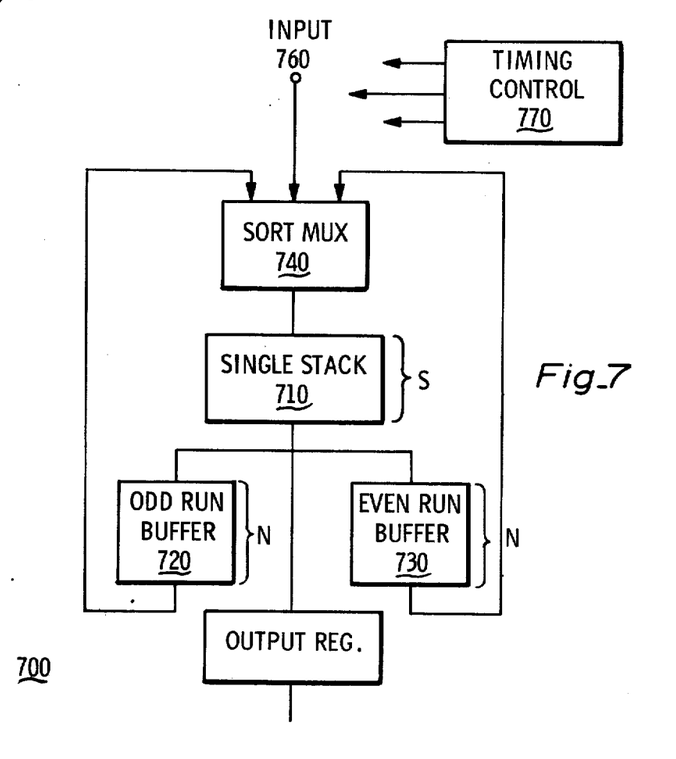
FIG. 7 is a block diagram of a multipass single stack sorter with buffer storage between passes.

FIG. 7 shows a multipass sorter 700 with a single sort stack 710 which is used in each pass. Simultaneous processing of more than one run (overlap operation) is not possible with single stack sorter 700. After each sort, the runs are stored in either odd run buffer 720 or even run buffer 730 until the next sort. Sort multiplexer 740 selects either input 760, odd run buffer 720, or even run buffer 730 in the proper sequence as determined by timing control 770. The END OF LIST pulse from timing control 770 could be programmed to issue after a fixed number of initial groups Q of S items each have been received from the input list, or after the input list has been exhausted (forming a variable Q). The fixed group stack is required to cycle through a fixed number of passes M to process each input list. The variable Q stack makes only as many passes as required to merge the initial groups into a single output group.

Design Considerations

Multipass sorters may be designed to sort various length lists with different hardware and time requirements. Some of the primary design considerations are:

Nmax = the greatest number of input items that the sorter can handle (the size of the input list)

t = the time required to sort Nmax

M = the number of passes required to sort Nmax

Q1, Q2 ———QM = the number of groups Q in each of the M passes

P1, P2 ———PM = the group size P in each of the M passes (the number of items)

S1, S2———SM = the stack size S (number of locations) in each of the M stages in the overlap embodiment. In the single stack embodiment (FIG. 7)

a single stage is used over and over M times, and therefore S is the same for each pass.

HwS = the hardware requirements for stack locations (the total number of sort elements 200 in all the stacks of all the stages)

HwMm = the hardware requirement in buffer memory locations

In a multistack overlap sorter, the above design considerations have the following relationship:

Nmax = S1*S2*----*Sm = S product
HwS = S1+S2+----+Sm = S sum
t = Nmax + (initialization time)
  = Nmax + (S1+S2+---Sm) = S product + S sum
HwMm = M*Nmax The following table shows two examples of overlap sorters with Nmax = 256 illustrating the tradeoffs between HwS, t, and HwMm as M is varied. In general, increasing M reduces Hws and t but increases HwMm.

| | Multistack-Overlap | |
|---|---|---|
| | M = 2 | M = 4 |
| Nmax | 256 | 256 |
| S sizes | S1 = S2 = 16 | S1 = S2 = S3 = S4 = 4 |
| HwS | S sum = 32 | S sum = 16 |
| t | 256 + 32 = 288 | 256 + 16 = 272 |
| HwMm | 2*256 = 512 | 4*256 = 1024 |

Similarly, in a single stack-nonoverlap sorter, the above design considerations have the following relationship:

Nmax = S product = $S^M$
HwS = S
t = M (Nmax + initialization time) = M (Nmax + S)
HwMm = 2*Nmax Similarly, in a single stack-nonoverlap sorter, the above design considerations have the following relationship:

Nmax = S product = $S^M$
HwS = S
t = M (Nmax + initialization time) = M (Nmax + S)
HwMm = 2*Nmax The following table shows the previous two examples (M=2 and M=4, for Nmax=256) for a single stack sorter illustrating that increasing M reduces HwS, but increases t, and HwMm remains constant.

| | Single Stack-Nonoverlap | |
|---|---|---|
| | M = 2 | M = 4 |
| Nmax | 256 | 256 |
| S | 16 | 4 |
| HwS | S sum = 16 | S sum = 4 |
| t | 512 + 32 = 544 | 1024 + 16 = 1040 |
| HwMm | 2*256 = 512 | 2*256 = 512 |

Detailed Description of Best Mode

The following paragraphs describe the structure and operation of each block in FIGS. 1, 2 and 5 in detail at the logic element level. Where appropriate, Texas Instrument integrated circuit numbers are provided from: "The TTL Data Book for Design Engineers," First Edition Copyright 1973, Texas Instruments Incorporated.

Input register 106 is a series of a six-bit registers (74S174) connected in parallel to receive key and non-key input data. The CLOCK and LOAD INPUT DATA are combined through a NAND gate (74S00) to supply the load input to six-bit register within register 106.

Stack 110 is a series of sort elements 200 sequentially arranged. The key input and NK PTR are inserted into the series in key numerical order.

NK buffer memory 120 (and 130) has one read write memory (SN 74S200) for each input bit. The memory (SN 74S200) has 256 locations which limits this best mode embodiment to an input list of 256 items (N=256). A larger buffer memory may be employed for larger N application.

NK PTR generator 124 is two synchronous 4-bit counters (SN 74161) in cascade for counting from 0-255 (the NK PTR for the 256 input items). The CLOCK and INPUT ENABLE are combined through a NAND gate (74S00) to provide NK WRITE to NK buffer 120 and to advance the counter. The counter is cleared by input ENABLE bar.

RUN PTR generator 134 is structurally identical to generator 124.

Stack 140 is identical in structure and operation to stack 110 except that the input key (A) is formed by concatenating the key and the Q RUN PTR (see Bi comparator 210).

Updater 160 is a four-bit adder (SN 74283) for incrementing the P RUN PTR by one to provide the address in run buffer 130 of the next key of the same run as the output key.

Output register 170 is structurally identical to input register 106.

Timing control 180 contains a crystal oscillator for determining the period of CLOCK.

Bi comparator 210 in first stack 110 is a two-level tree formed by five four-bit magnitude comparators (Ser. No. 74S85), four in the first level and one in the second level. The tree compares the input A key on input bus 230 to the sorted Bi key in Bi register 220. UNLOAD FLAG is applied to the MSB of the first level of comparator 210. The A=B case is handled by hardwiring the LSB of A key to 1 and the LSB of Bi key to 0. Whenever A=B, B has priority because it is hardwired to appear smaller than A.

Bi comparator 210 in second stack 140 is identical in structure and operation to the first stack comparators, except an extra four-bit comparator (Ser. No. 74S85) is required in the first comparison level to accommodate Q RUN PTR. The key A of first stack 110 is combined with Q RUN PTR from run address counter 520 to form the key A of second stack 140. Also, EMPTY FLAG is applied to the next MSB of the first level of comparator 210.

Bi register 220 and Bi key MUX 240 may be combined in a series of parallel arranged quadruple 2-input multiplexer with storage (Ser. No. 74298).

Strobe flip flop 250 is a D-type flip flop (Ser. No. 74S74). The inverted CLEAR required by this flip flop is provided by combining CLOCK bar with STROBE through a NAND gate (Ser. No. 74S00).

Flip Flop 280 is one quarter of a 4-bit parallel access shift register (Ser. No. 74195) with all parallel inputs tied to logical signal 1.

Initializer multiplexer 510 is two 2-input multiplexers (74s157), one for Q RUN PTR and one for P RUN PTR.

Run address counter 520 is a 4-bit counter (74161) for counting from Q=0 to Q=15.

We claim as our invention:

1. An M stage sorter for arranging input numbers into a numerically sorted output list, comprising:
   means for grouping the input numbers into groups;
   a first stage for ordering the input numbers within each of the groups, formed by a sorting stack which includes:
      stack input means for sequentially receiving all of the numbers within each of the groups;
      comparing means for comparing each currently received number to the previously received numbers from the same group; and
      stack storage means for inserting each currently received number into proper numerical order among the numbers previously received from the same group;
   M-1 subsequent stages for progressively forming fewer groups of more numbers each, the last stage of which forms the numerically sorted output list, each stage including:
      interstage storage means for storing the ordered groups from the preceding stage;
      stack input means for sequentially receiving each of the numbers stored in the interstage storage means;
      comparing means for comparing each currently received number to the previously received numbers currently in the sorting stack;
      pushdown storage means of inserting each currently received number into proper numerical order among the previously inserted numbers, which pushdown storage means progressively fills up from a first position to a last position as each currently received number is inserted;
      interstage output means for advancing the current number in the last position to the next stage; and
      pointer means for identifying the next-to-be received number from the interstage storage means which is the next number from the same group as the current number in the last position; and
      output means for receiving the ordered numbers from the last stage.

2. The sorter of claim 1, wherein M = 2.

3. The sorter of claim 1, wherein the input is N numbers and divided into Q groups of P numbers each.

4. The sorter of claim 3, wherein $N = Q \times P$.

5. The sorter of claim 4, wherein $P = Q = \sqrt{N}$ for minimizing the circuitry required for sorting N input items.

6. The sorter of claim 1, wherein the comparing means displaces by one location in the pushdown storage means all the previously sorted numbers on one side of the insertion point to provide an empty location for the currently received number.

7. The sorter of claim 6, wherein the comparing means is a plurality of comparators, one associated with each location within the pushdown storage means, for determining whether each currently received number is less than or greater than each previously sorted number in the pushdown storage means.

8. The sorter of claim 7, wherein the plurality of comparators determine whether each new number is less than each previously sorted number or equal to or greater than each previously sorted number of causing the pushdown storage means to shift down by one location all previously sorted numbers which are less than the currently received number.

9. The sorter of claim 7, wherein the stack input means is a parallel input means permitting each new number to be presented simultaneously to the plurality of comparators.

10. The sorter of claim 6, wherein the sort stack is formed by a plurality of location elements $E_1, E_2, E_3 \ldots E_i \ldots E_n$, each element comprising:
   a shift register $R_i$ for holding one sorted item $B_i$;
   a comparator $C_i$ for determining whether the currently received number A is less than or greater than the contents $B_i$ of the shift register; and
   a gating circuit $G_i$ responsive to the comparator $C_i$ and to the comparator $G_{i-1}$ of the previous element $E_{i-1}$ for displacing the sorted item $B_i$ to the next element $B_i +1$ and entering the new item A into register $R_i$ when
   A is greater than or equal to $B_i$, and
   A is less than $B_{i-1}$.

11. The sorter of claim 1, wherein each of the N input numbers has a key portion which is arranged into numerical order by the sorter, and a nonkey portion.

12. The sorter of claim 11, wherein a nonkey storage means retains the nonkey portion, and a nonkey pointer means provides the nonkey storage address of each nonkey portion to the first stage.

13. The sorter of claim 12, wherein the nonkey pointer means includes a counter for generating the nonkey storage address.

14. A single stage multipass sorter for arranging input numbers into numerical order, comprising:
   grouping means for initially grouping the input numbers;
   a single sorting stack for initially ordering all of the numbers within each group formed by the grouping means to provide a first run of ordered groups, and for subsequently receiving the first number of each group in the first run to provide a second run with fewer groups of more numbers in each group, which is in turn sorted by the single stack until all of the groups have been merged into a single run, the single sorting stack comprising:
      stack input means for initially receiving in sequence all of the input numbers within each of the groups, and for subsequently receiving in sequence the first number in each group of a run;
      comparing means for initially comparing each currently received input number to the numbers previously received from the same group, and for subsequently comparing each currently received first number to the numbers previously received from the same run; and
      stack storage means having a sequence of locations for initially entering each currently received input number into proper numerical order within each group, and for subsequently entering each currently received first number into proper numerical order within the run then being formed, the stack storage means progressively filling from the first location to the last location as each currently received number is entered;
      an interpass storage means associated with each run for storing that run between passes by sequentially receiving the run numbers from the single sorting stack as they pass therethrough the last position therein;
      a pointer means associated with each interpass storage means for identifying the number next to be received by the single sorting stack from within the associated storage means which is the next number from the same group as the number currently in the last location of the single sort stack; and multiplexer means for initially selecting the grouping means as source of numbers into the single sorting stack, and for subsequently selecting each of the interpass storage means as the source of numbers into the single sorting stack.

15. the multipass sorter of claim 14, wherein the comparing means has S comparing elements and the stack storage means has S locations for merging S groups at a time causing the number of groups to decrease by a factor of S each pass and causing the size of each group to increase by a factor of S each pass.

16. The multipass sorter of claim 15, wherein the means for initially grouping the input numbers forms initial groups of s numbers each.

17. The multipass sorter of claim 16, wherein the number of input numbers is N and initially grouped into N/S initial groups.

18. The multipass sorter of claim 17 wherein each interpass storage means is a random access memory which reads to receive its run of N numbers as they are sorted by the single sorting stack, and which writes to supply the N numbers to the single sorting stack for sorting.

19. The multipass sorter of claim 18, wherein there is a first and second interpass storage means each of which alternatively reads and writes in opposition with the other to provide reading to and writing from the storage means.

20. The multipass sorter of claim 19, wherein the first interpass storage means reads during odd passes and writes during even passes, and the second interpass storage means reads during even passes and writes during odd passes.

21. The multipass sorter of claim 20, wherein the first and second interpass storage means each have a capacity of N.

* * * * *